US012684664B2

(12) United States Patent
Li

(10) Patent No.: US 12,684,664 B2
(45) Date of Patent: Jul. 14, 2026

(54) LED LIGHT SOURCE SIMULTANEOUSLY COMPATIBLE WITH SILICON-CONTROLLED-RECTIFIER DIMMING AND INTELLIGENT DIMMING, AND LAMP

(71) Applicant: SHENZHEN SUNMOON MICROELECTRONICS CO., LTD., Shenzhen (CN)

(72) Inventor: Zhaohua Li, Shenzhen (CN)

(73) Assignee: SHENZHEN SUNMOON MICROELECTRONICS CO., LTD., Shenzhen (CN)

( * ) Notice: Subject to any disclaimer, the term of this patent is extended or adjusted under 35 U.S.C. 154(b) by 37 days.

(21) Appl. No.: 19/026,532

(22) Filed: Jan. 17, 2025

(65) Prior Publication Data

US 2025/0168945 A1 May 22, 2025

Related U.S. Application Data

(63) Continuation of application No. PCT/CN2023/087743, filed on Apr. 12, 2023.

(30) Foreign Application Priority Data

Aug. 22, 2022 (CN) ......................... 202211004779.5

(51) Int. Cl.

*H05B 45/14* (2020.01)
*H05B 45/31* (2020.01)
*H05B 45/345* (2020.01)

(52) U.S. Cl.

CPC ............. *H05B 45/14* (2020.01); *H05B 45/31* (2020.01); *H05B 45/345* (2020.01)

(58) Field of Classification Search

CPC ...... H05B 45/14; H05B 45/345; H05B 45/10; H05B 45/32; H05B 47/165; H05B 45/31-315; H05B 47/185; Y02B 20/40

See application file for complete search history.

(56) References Cited

U.S. PATENT DOCUMENTS

2015/0312982 A1* 10/2015 Melanson .............. H05B 45/14 315/287
2018/0115234 A1* 4/2018 Liu .................... H05B 45/3575

(Continued)

FOREIGN PATENT DOCUMENTS

CN 105873269 A 8/2016

*Primary Examiner* — Renan Luque

(57) ABSTRACT

An LED light source simultaneously compatible with SCR dimming and intelligent dimming is provided. A central control unit collects a SCR phase-cut angle of a power supply unit, generates a feedback signal according to the SCR phase-cut angle to an intelligent dimming unit; the intelligent dimming unit receives a control instruction, generates a dimming signal according to the control instruction and the feedback signal to a constant-current unit, and generates an adjustment signal according to the control signal to the central control unit; the constant-current unit adjusts light emitting state according to the dimming signal; the central control unit generates a SCR current control signal according to the SCR phase-cut angle or the adjustment signal to a SCR current output unit; the SCR current output unit adjusts an output current according to the SCR current control signal. Therefore, compatible control of SCR dimming and intelligent dimming can be implemented.

14 Claims, 7 Drawing Sheets

(56) References Cited

U.S. PATENT DOCUMENTS

| | | | | |
|---|---|---|---|---|
| 2021/0153313 | A1* | 5/2021 | Li | H05B 47/165 |
| 2021/0307138 | A1* | 9/2021 | Liu | H05B 45/31 |

* cited by examiner

LED LIGHT SOURCE SIMULTANEOUSLY COMPATIBLE WITH SILICON-CONTROLLED-RECTIFIER DIMMING AND INTELLIGENT DIMMING, AND LAMP

CROSS-REFERENCE TO RELATED APPLICATIONS

The present application is a continuation application of a PCT application No. PCT/CN2023/087743 filed on Apr. 12, 2023, which claims the benefit of Chinese Patent Application No. 202211004779.5 filed on Aug. 22, 2022. All the above are hereby incorporated by reference.

FIELD

The present application relates to LED (light-emitting diode) chip technologies, and in particular, to an LED light source simultaneously compatible with silicon-controlled-rectifier dimming and intelligent dimming, and a lamp thereof.

BACKGROUND

As a new type of energy-saving and environmentally friendly product, LED lighting fixtures have reached a dimming level of traditional tungsten filament lamps on SCR (silicon-controlled-rectifier) dimmers in the field of dimming technology with a development of technologies. In another field of dimming technologies, with a rapid rise and development of IOT (Internet-of-Things) intelligent modules, intelligent lighting technology has become quite mature. However, in the two major fields of SCR dimming and intelligent lighting dimming, although significant progress has been made for LED power drivers or LED lamps, there is no method or product that can effectively meet the needs of SCR dimming and achieve intelligent dimming.

SUMMARY

The purpose of the present application is to provide an LED light source simultaneously compatible with SCR dimming and intelligent dimming, in response to the current situation where LED lighting technology cannot be simultaneously compatible with SCR dimming and intelligent dimming. By combining traditional SCR dimming technology with intelligent dimming technology, the LED light source or LED lamp can meet the dimming needs of SCR dimmer and achieve intelligent dimming on a SCR dimmer.

According to an aspect of the present application, an LED light source simultaneously compatible with SCR dimming and intelligent dimming is provided, comprising a power supply unit, an intelligent dimming unit, a constant-current unit, a SCR current output unit, and a central control unit, wherein an output terminal of the power supply unit is connected to an input terminal of the central control unit, an input terminal of the intelligent dimming unit and an input terminal of the constant-current unit, the central control unit is in bidirectional communication with the intelligent dimming unit, and an output terminal of the central control unit is also connected to an input terminal of the SCR current output unit, an output terminal of the intelligent dimming unit is also connected to an input terminal of the constant-current unit, and an output terminal of the SCR current output unit is connected to an input terminal of the power supply unit; and wherein the central control unit is configured to collect a SCR phase-cut angle of the power supply unit, and generate a feedback signal based on the SCR phase-cut angle and send the feedback signal to the intelligent dimming unit; the intelligent dimming unit is configured to receive a control signal from a IOT terminal, and generate a dimming signal based on the control signal and the feedback signal and send the dimming signal to the constant-current unit, and also configured to generate an adjustment signal based on the control signal and send the adjustment signal to the central control unit; the constant-current unit is configured to adjust light emission state according to the dimming signal; the central control unit is also configured to generate a SCR current control signal based on the SCR phase-cut angle or the adjustment signal and send the SCR current control signal to the SCR current output unit; and the SCR current output unit is configured to adjust output current according to the SCR current control signal.

In the LED light source simultaneously compatible with SCR dimming and intelligent dimming according to an embodiment of the present application, the power supply unit comprises a SCR dimmer, a rectification circuit and an isolation diode D1, wherein an input terminal of the SCR dimmer is connected to an AC input signal, and an output terminal of the SCR dimmer is connected to an input terminal of the rectification circuit, a first terminal of the rectification circuit is connected to the input terminal of the central control unit, and a second terminal of the rectification circuit is connected to a positive terminal of the isolation diode D1, a negative terminal of the isolation diode D1 is connected to the input terminal of the intelligent dimming unit and the input terminal of the constant-current unit; and the AC input signal passes through the SCR dimmer and the rectification circuit to output a chopped voltage signal.

In the LED light source simultaneously compatible with SCR dimming and intelligent dimming according to an embodiment of the present application, the intelligent dimming unit comprises a power supply selecting module, an AC-DC power supply module, an LDO power supply module and an intelligent control module, wherein an input terminal of the power supply selecting module is connected to the output terminal of the power supply unit, and an output end of the power supply selecting module is connected to an input terminal of the AC-DC power supply module and an input terminal of the LDO power supply module; an output terminal of the AC-DC power supply module and an output terminal of the LDO power supply module are connected to an input terminal of the intelligent control module; and the power supply selecting module selects one of the AC-DC power supply module and the LDO power supply module to supply power to the intelligent control module based on an output voltage of the power supply unit.

In the LED light source simultaneously compatible with SCR dimming and intelligent dimming according to an embodiment of the present application, the central control unit comprises a SCR phase detecting module and a central core control module, wherein an input terminal of the SCR phase detecting module is connected to the power supply unit, an output terminal of the SCR phase detecting module is connected to the central core control module, the central core control module communicates bi-directionally with the intelligent control module; and wherein the SCR phase detecting module is configured to collect a SCR phase-cut angle of the power supply unit; the central core control module is configured to send the feedback signal to the intelligent control module when the SCR phase-cut angle is less than a first preset threshold, and simultaneously send a SCR current control signal to the SCR current output unit to control the SCR current output unit to increase the output current, and send a SCR current control signal to the SCR current output unit to control the SCR current output unit to decrease the output current when the SCR phase-cut angle is greater than a second preset threshold, wherein the first preset threshold is less than the second preset threshold.

In the LED light source simultaneously compatible with SCR dimming and intelligent dimming according to an embodiment of the present application, the constant-current unit comprises an LED constant-current module and an LED light group module, wherein an input terminal of the LED constant-current module is connected to the intelligent control module, an output terminal of the LED constant-current module is connected to an input terminal of the LED light group module, and the input terminal of the LED light group module is also connected to the output terminal of the power supply unit; and the intelligent control module sends a standby instruction to the LED constant-current module when receiving the feedback signal, and the LED constant-current module turns off the LED light group module according to the standby instruction.

In the LED light source simultaneously compatible with SCR dimming and intelligent dimming according to an embodiment of the present application, when the control instruction is standby or low brightness, the intelligent control module generates the adjustment signal to the central core control module according to the control instruction, and the central core control module sends a SCR current control signal to the SCR current output unit to control the SCR current output unit to reduce the output current.

In the LED light source simultaneously compatible with SCR dimming and intelligent dimming according to an embodiment of the present application, the SCR phase detecting module comprises a resistor R2, a resistor R3 and a clamp tube DZ1, wherein one end of the resistor R2 is connected to the output terminal of the power supply unit, the other end of the resistor R2 is connected to one end of the resistor R3, a negative terminal of the clamp tube DZ1 and the central core control module, and the other end of the resistor R3 and a positive terminal of the clamp tube DZ1 are grounded.

According to the other aspect of the present application, an LED lamp comprising an LED light source simultaneously compatible with SCR dimming and intelligent dimming as described above.

Implementing the embodiments of the present application has the following beneficial effects: the LED light source simultaneously compatible with SCR dimming and intelligent dimming provided by the present application comprises a power supply unit, an intelligent dimming unit, a constant-current unit, a SCR current output unit, and a central control unit, wherein the central control unit collects and judges a voltage waveform of the SCR phase-cut angle inside the power supply unit, and outputs different signals to the intelligent dimming unit and the SCR current control unit at different phase angle values to adjust and control working modes of different circuit units; and the intelligent dimming unit can match different power supply modes at different SCR phase angles. During the SCR dimming process, it is normal for the intelligent dimming unit to control the constant-current unit. Thus, compatible control of SCR dimming and intelligent dimming can be achieved to meet user's needs.

BRIEF DESCRIPTION OF THE DRAWINGS

In order to more clearly explain embodiments of the present application or technical solutions in the prior art, drawings used in the description of the embodiments or the prior art will be briefly introduced below. Obviously, the drawings in the following description are merely some embodiments of the present application. For those of ordinary skill in the art, other drawings can be obtained based on these drawings without creative efforts.

DETAILED DESCRIPTION

Figure 1:
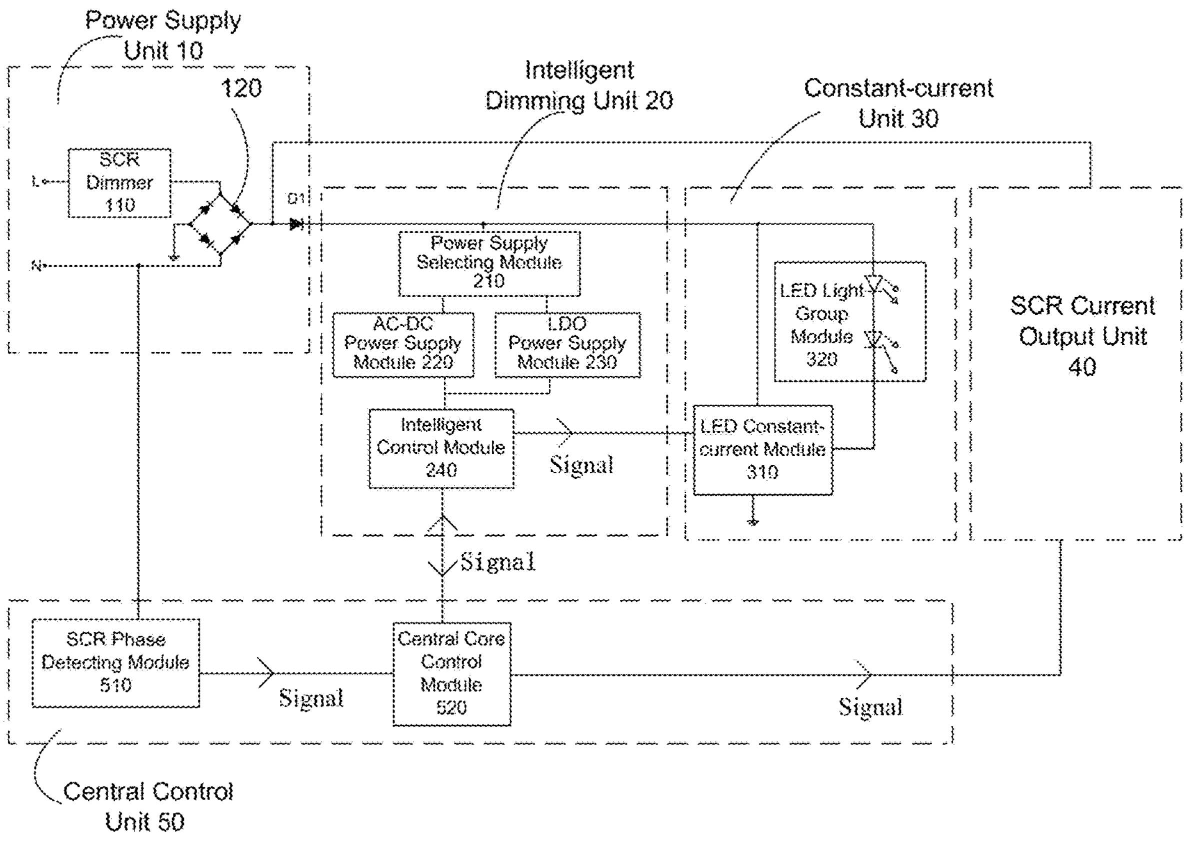
FIG. 1 shows a schematic diagram of an LED light source simultaneously compatible with SCR dimming and intelligent dimming according to the present application.

In order to facilitate understanding of the present application, the present application will be described more fully hereinafter with reference to the related drawings. Typical embodiments of the application are shown in the drawings. However, the present application may be embodied in many different forms and is not limited to the embodiments described herein. Rather, these embodiments are provided so that the disclosure to the present application will be thorough and complete.

Unless otherwise defined, all technical and scientific terms used herein have the same meaning as commonly understood by one of ordinary skill in the art to which this application belongs. The terms used herein in the description of the present application are for the purpose of describing specific embodiments only and are not intended to limit the present application.

The overall idea of the present application is to provide an LED light source simultaneously compatible with SCR dimming and intelligent dimming, comprising a power supply unit, an intelligent dimming unit, a constant-current unit, a SCR current output unit, and a central control unit, in response to the current situation where LED lighting technology cannot be simultaneously compatible with SCR dimming and intelligent dimming. The central control unit collects and judges a voltage waveform of the SCR phase-cut angle inside the power supply unit, and outputs different signals to the intelligent dimming unit and the SCR current control unit at different phase angle values to adjust and control working modes of different circuit units. The intelligent dimming unit can match different power supply modes at different SCR phase angles. During the SCR dimming process, it is normal for the intelligent dimming unit to control the constant-current unit. Thus, compatible control of SCR dimming and intelligent dimming can be achieved to meet user's needs.

In order to better understand the above technical solution, the following will provide a detailed explanation of the above technical solution in conjunction with the accompanying drawings and embodiments. It should be understood that the embodiments of the present application and the specific features in the embodiments are detailed explanations of the technical solution of the present application, rather than limitations on the technical solution of the present application. In the absence of conflicts, the embodiments of the present application and the technical features in the embodiments can be combined with each other.

FIG. 1 shows a schematic diagram of an LED light source simultaneously compatible with SCR dimming and intelligent dimming according to the present application. As shown in FIG. 1, the LED light source simultaneously compatible with SCR dimming and intelligent dimming comprises a power supply unit 10, an intelligent dimming unit 20, a constant-current unit 30, a SCR current output unit 40, and a central control unit 50. Among them, the central control unit 50 is configured to collect a SCR phase-cut angle of the power supply unit, and generate a feedback signal based on the SCR phase-cut angle and send the feedback signal to the intelligent dimming unit 20. The intelligent dimming unit 20 is configured to receive a control signal from a IOT terminal, and generate a dimming signal based on the control signal and the feedback signal and send the dimming signal to the constant-current unit 30. The intelligent dimming unit 20 is also configured to generate an adjustment signal based on the control signal and send the adjustment signal to the central control unit 20. The constant-current unit 30 is configured to adjust light emission state according to the dimming signal. The central control unit 50 is also configured to generate a SCR current control signal based on the SCR phase-cut angle or the adjustment signal and send the SCR current control signal to the SCR current output unit 40. The SCR current output unit 40 is configured to adjust output current according to the SCR current control signal.

Specifically, in one embodiment of the present application, the power supply unit 10 rectifies a AC input signal and outputs it to the central control unit 50, the intelligent dimming unit 20 and the constant-current unit 30. The power supply unit 10 comprises a SCR dimmer 110, a rectification circuit 120 and an isolation diode D1. The AC input signal passes through the SCR dimmer 110 and the rectification circuit 120 and then a chopped voltage signal is output. Further, an input terminal of the SCR dimmer 110 is connected to the AC input signal, an output terminal of the SCR dimmer is connected to an input terminal of the rectification circuit, and a first terminal of the rectification circuit is connected to an input terminal of the central control unit. The central control unit 20 collects a rectified chopped voltage signal to control operation of subsequent circuits. A second terminal of the rectification circuit is connected to a positive terminal of the isolation diode D1, and a negative terminal of the isolation diode D1 is connected to an input terminal of the intelligent dimming unit and an input terminal of the constant-current unit. The intelligent dimming unit collects the chopped voltage signal for subsequent power supply mode selection, and the constant-current unit uses the output chopped voltage signal as a power supply voltage.

Specifically, in one embodiment of the present application, the intelligent dimming unit 20 comprises a power supply selecting module 210 connected to the power supply unit, an AC-DC power supply module 220 and an LDO power supply module 230 connected to the power supply selecting module 210, and an intelligent control module 240 connected to the AC-DC power supply module 220 and the LDO power supply module 230. The power supply selecting module 210 is configured to select one of the AC-DC power supply module 220 and the LDO power supply module 230 to supply power to the intelligent control module 240 based on the output voltage of the power supply unit. After the AC signal passes through the power supply unit, a chopped signal waveform is output to the power supply selecting module. When the SCR dimmer switches to a small phase angle state, the output chopped voltage is low. After the power supply selecting module recognizes the low voltage state, it turns off the AC-DC power supply module and enables the LDO power supply module to work, and the LDO power supply module provides voltage to the intelligent control module. When the SCR dimmer is not operating in the small phase angle state, the chopped voltage output by the power supply unit becomes high. After the power supply selecting module recognizes the high voltage state, it turns off the LDO power supply module and enables the AC-DC power supply module to work, and the AC-DC power supply module provides voltage to the intelligent control module. Thus, it ensures that the intelligent control module can obtain sufficient power supply voltage for the SCR dimmer at different phase angles, that is, during the SCR dimming process, the intelligent control module is always in normal working mode.

Specifically, in one embodiment of the present application, the central control unit 50 comprises a SCR phase detecting module 510 connected to the power supply unit 10, and a central core control module 520 connected to the SCR phase detecting module 510 and in bidirectional communication with the intelligent control module 240. The SCR phase detecting module 510 collects a voltage waveform of the SCR phase-cut angle inside the power supply unit. The implementation of the SCR phase detecting module is not limited (integrated circuit chips with waveform detection function or circuits built with discrete components can be used). The SCR phase detecting module collects a current dimming stroke of the SCR dimmer in real time, identifies a magnitude of the chopped voltage waveform after passing through the SCR dimmer, and provides the information to the central core control module.

Figure 8:
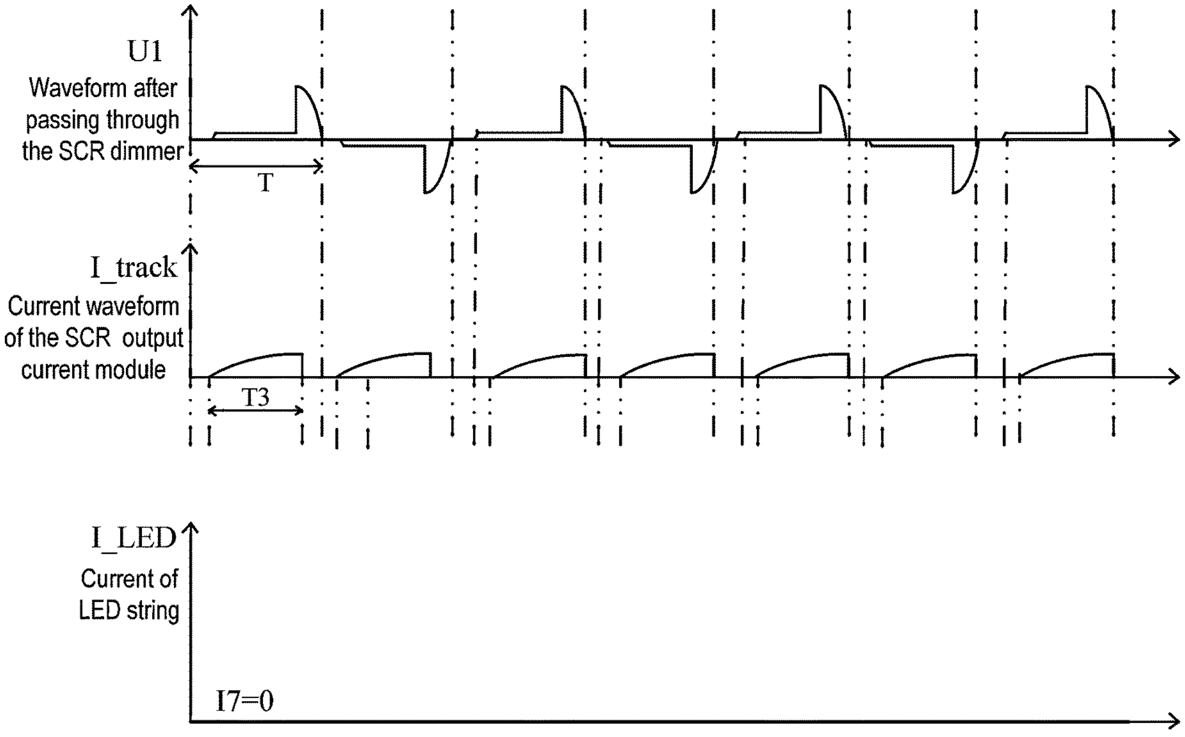
FIG. 8 shows relevant waveforms when the SCR phase-cut angle of the power supply unit is a minimum SCR phase angle.

Furthermore, in one embodiment of the present application, the central core control module 520 is configured to send a feedback signal to the intelligent control module when the SCR phase-cut angle is less than a first preset threshold. The central core control module processes a current phase angle of the SCR dimmer and outputs the feedback signal to the intelligent control module to adjust the information of the intelligent control module to the constant-current unit. When the phase angle of the SCR dimmer is less than a fixed value (i.e. in a small phase angle working mode as shown in FIG. 8), the central core control module sends an instruction to inform the intelligent control module, and the intelligent control module sends a standby instruction to the constant-current unit to turn off the LED light group module, and the LED light groups will not light up. Therefore, a problem of LED light string flickering caused by the SCR dimmer at a small phase angle can be shielded.

Figure 6:
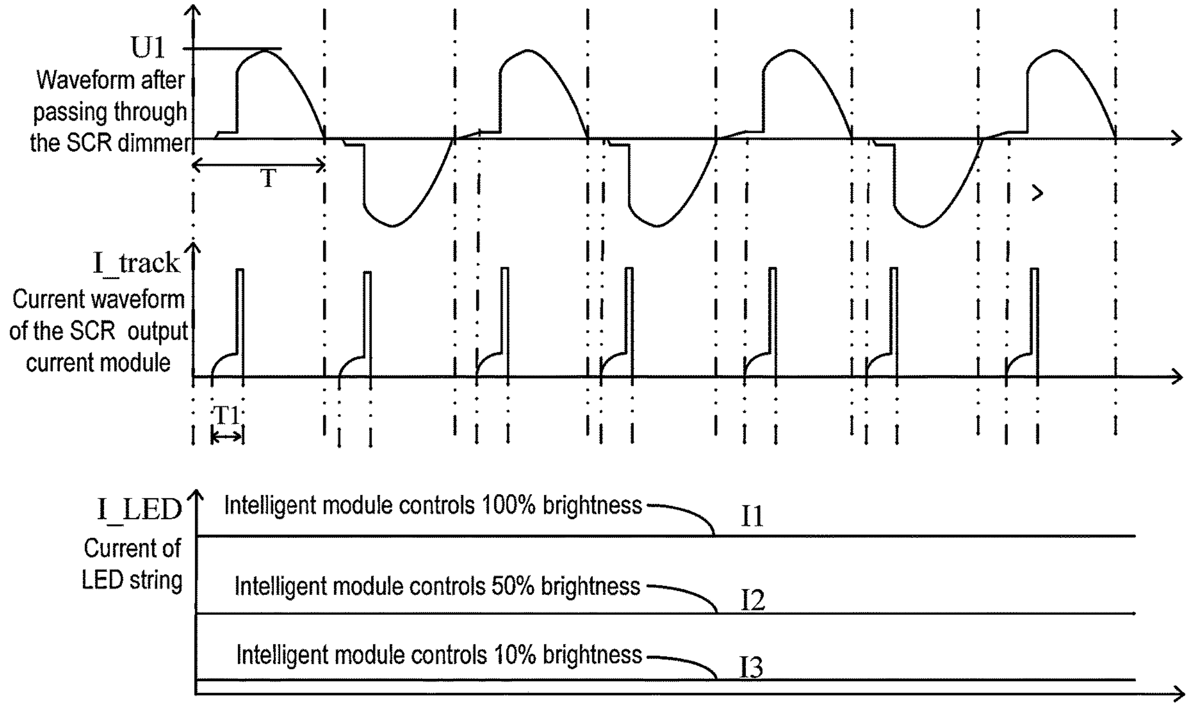
FIG. 6 shows relevant waveforms when a SCR phase-cut angle of the power supply unit is a maximum SCR phase angle.
Figure 7:
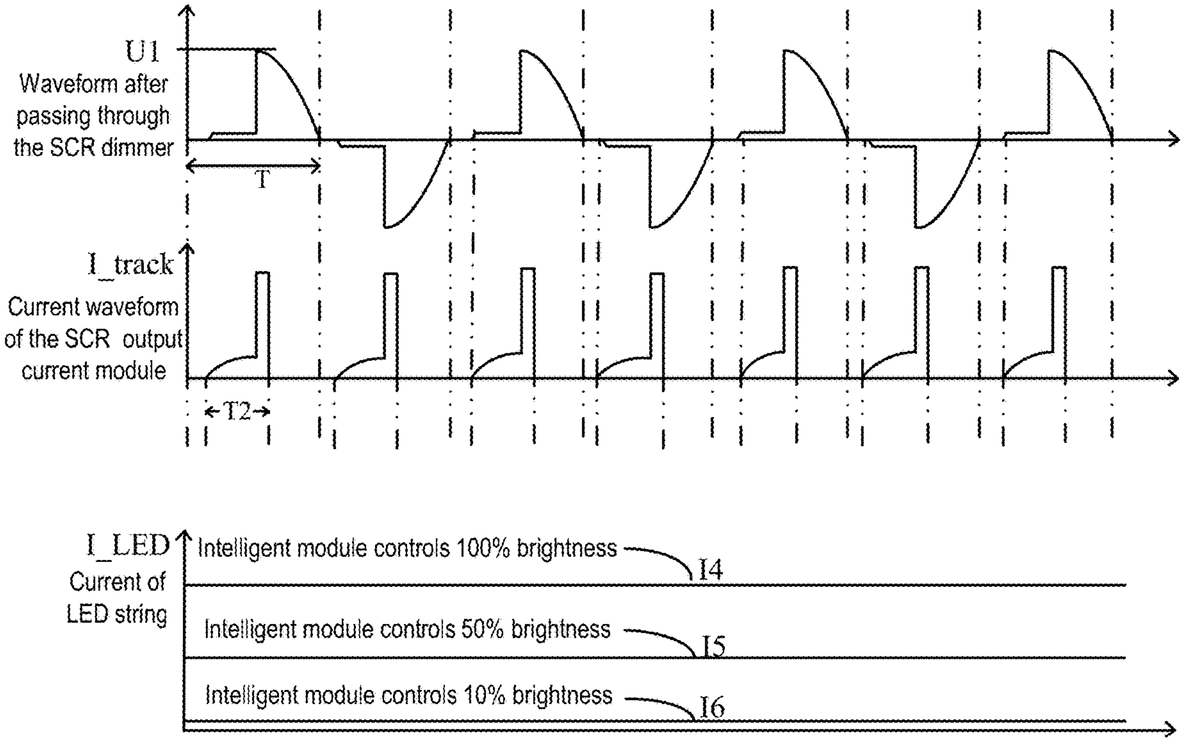
FIG. 7 shows relevant waveforms when the SCR phase-cut angle of the power supply unit is a middle SCR phase angle.

Furthermore, in one embodiment of the present application, the central core control module 520 is configured to send a SCR current control signal to the SCR current output unit to control the SCR current output unit to increase the output current when the SCR phase-cut angle is less than the first preset threshold, and send a SCR current control signal to the SCR current output unit to control the SCR current output unit to decrease the output current when the SCR phase-cut angle is greater than a second preset threshold, wherein the first preset threshold is less than the second preset threshold. The central core control module processes based on the current phase angle of the SCR dimmer and outputs a control signal to the SCR current output unit to adjust the working state of the SCR output current unit. As shown in FIG. 6 and FIG. 7, when the SCR dimmer operates in a small phase mode, the current of the SCR current output module increases; and when the SCR dimmer operates in a high phase mode, the current of the SCR current output module decreases.

Furthermore, in one embodiment of the present application, the central core control module 520 is also configured to record a maximum phase angle of each type of SCR dimmers and latch the maximum phase angle, so as to adjust a minimum output current to the SCR current output unit when using that type of SCR dimmer in the future.

Specifically, in one embodiment of the present application, the constant-current unit 30 comprises an LED constant-current module 310 connected to the intelligent control module 240, and an LED light group module 320 connected to the LED constant-current module 310 and the power supply unit 10. Among them, the implementation form of the LED constant-current module 310 is not limited. Any integrated circuit or discrete device that can achieve constant-current function can be used for the LED constant-current module. Number of current channels output by the LED constant-current module can be single, double, triple, or multiple. The LED light group module 320 is matched based on the number of current channels of the LED constant-current module 310.

Specifically, in one embodiment of the present application, the intelligent control module 240 receives control instructions from the IOT terminal (such as standby, increasing brightness, decreasing brightness, etc.), generates a dimming signal based on the control instruction and the feedback signal from the central core control module, and sends the feedback signal to the LED constant-current unit to adjust lighting state of the LED light groups inside the LED constant-current unit. The intelligent control module can adopt any IOT module with intelligent control function, such as infrared control, radar control, remote control, APP control, voice control, etc. The signal control form of the LED constant-current module inside the constant-current unit by the intelligent control module is not limited. The dimming signal sent by the intelligent control module can be a PWM (pulse width modulation) signal, an AM (analog dimming) signal, IIC, SPI, DMX512, single line communication and other types of digital dimming signals.

Furthermore, in one embodiment of the present application, the intelligent control module also feeds back current status information of the LED output current to the central control unit, and the central control unit adjusts the working status of the SCR output current unit based on the received information. That is, when the control instruction is standby or low brightness, the intelligent control module generates an adjustment signal according to the control instruction and feeds it back to the central core control module. The central core control module sends a SCR current control signal to the SCR current output unit based on the adjustment signal to control the SCR current output unit to reduce the output current. Thus, when the system enters a standby mode, the output current to the SCR dimmer can be reduced in a timely manner to ensure that the system is in a low-power state.

Embodiment 1

Figure 2:
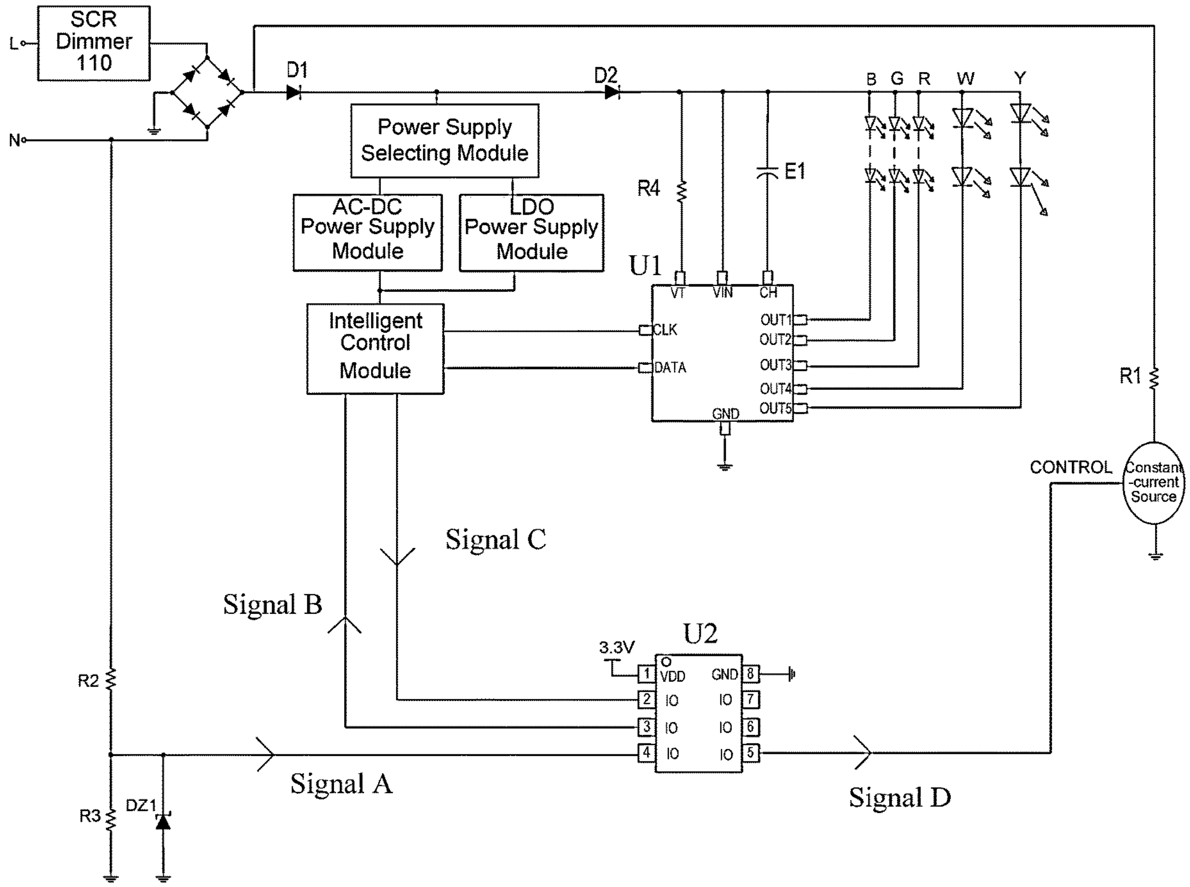
FIG. 2 shows a circuit diagram of an LED light source simultaneously compatible with SCR dimming and intelligent dimming according to a first embodiment of the present application.
Figure 5:
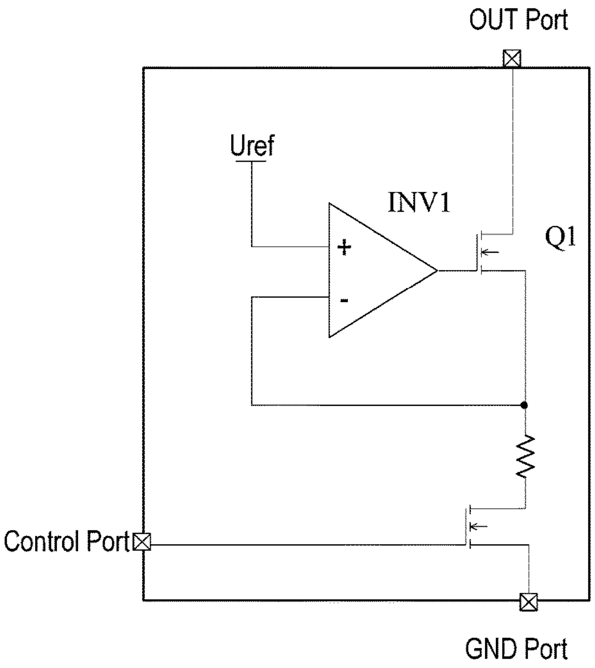
FIG. 5 shows a circuit diagram of the SCR current output unit in FIG. 1.

FIG. 2 shows a circuit diagram of an LED light source simultaneously compatible with SCR dimming and intelligent dimming according to a first embodiment of the present application. As shown in FIG. 2, the SCR phase detecting module comprises a resistor R2, a resistor R3, and a clamp tube DZ1. One end of the resistor R2 is connected to the output terminal of the power supply unit, and the other end of the resistor R2 is connected to one end of the resistor R3, a negative terminal of the clamp tube DZ1 and the central core control module. The other end of the resistor R3 and a positive terminal of the clamp tube DZ1 are grounded. In this embodiment, the SCR phase detecting module uses the resistors to divide the voltage and converts it into a pulse width signal Signal A through the clamp tube. The duty cycle of the pulse width signal reflects the dimming phase angle of the SCR dimmer. The control chip U2 in FIG. 2 serves as the central core control module in FIG. 1. The constant-current source and R1 in FIG. 2 are used as the SCR current output module in FIG. 1, where a circuit of the constant-current source is shown in FIG. 5. The intelligent control module and the control chip U2 communicate bi-directionally. When the SCR dimmer is detected to be at a small phase angle, the control chip U2 sends a signal Signal B to the intelligent control module; and when the intelligent control module sends a standby signal or a low dimming signal to the constant-current unit, the intelligent control module synchronously sends a signal Signal C to the control chip U2, and the control chip U2 sends a signal Signal D to the constant-current source to adjust the working current of the constant-current source to decrease and reduce working losses. Furthermore, U1 is an LED constant-current control integrated circuit chip, and E1 is an electrolytic capacitor connected to U1's CH port, which has a current compensation function. It compensates for the current of the LED light groups in any cycle of online network, and the output current of the LED light groups is flicker free. The communication form between the intelligent control module and the chip U1 is IIC protocol. Output ports OUT of the chip U1 are connected to 5 groups of light strings with different color temperatures.

Embodiment 2

Figure 3:
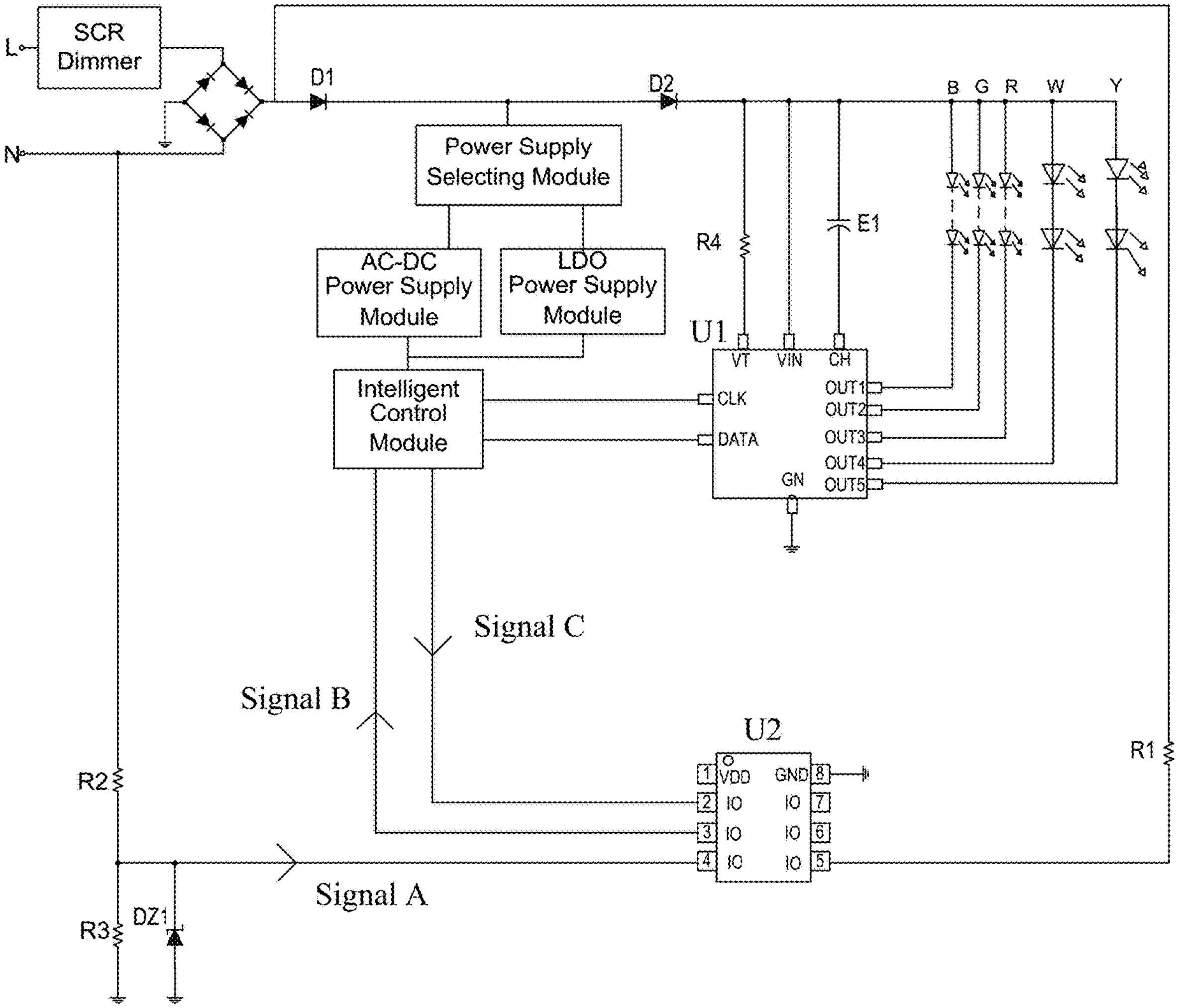
FIG. 3 shows a circuit diagram of an LED light source simultaneously compatible with SCR dimming and intelligent dimming according to a second embodiment of the present application.

FIG. 3 shows a circuit diagram of an LED light source simultaneously compatible with SCR dimming and intelligent dimming according to a second embodiment of the present application. In the embodiment shown in FIG. 3, U3 is an integrated circuit chip that integrates the functions of the control chip U2 and the constant-current source in FIG. 2. The remaining working modes are consistent with the embodiment as shown in FIG. 2, and will not be repeated here.

Embodiment 3

Figure 4:
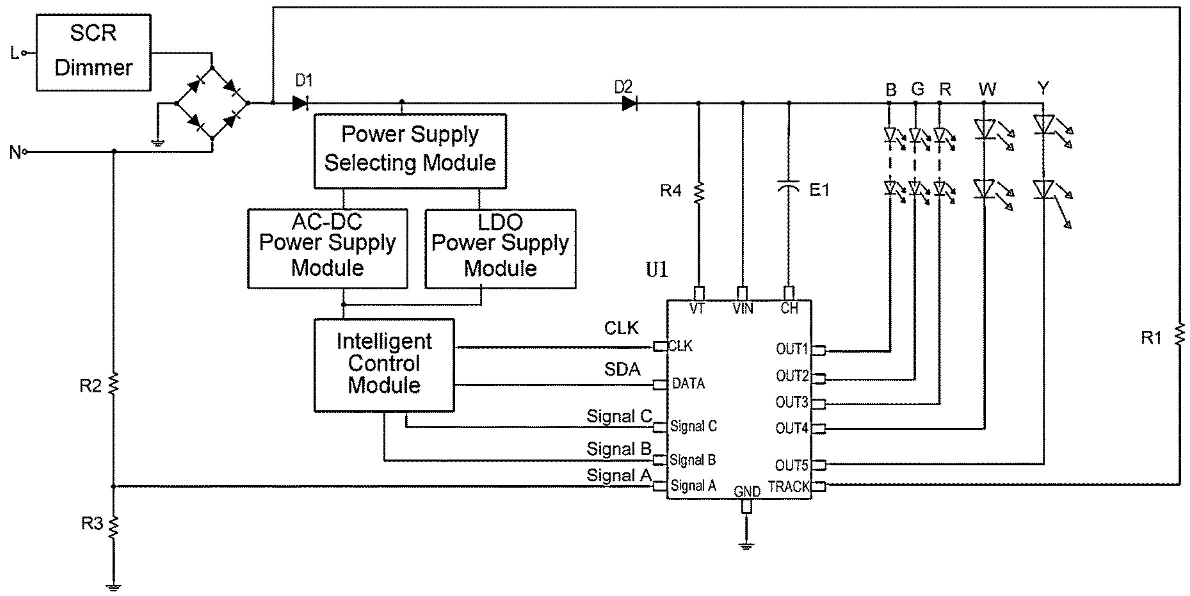
FIG. 4 shows a circuit diagram of an LED light source simultaneously compatible with SCR dimming and intelligent dimming according to a third embodiment of the present application.

FIG. 4 shows a circuit diagram of an LED light source simultaneously compatible with SCR dimming and intelligent dimming according to a third embodiment of the present application. U4 is an integrated circuit chip that integrates the functions of the control chip U2, the constant-current source and the LED constant-current driver chip U1 shown in FIG. 2. The remaining working modes are consistent with the embodiment as shown in FIG. 2, and will not be repeated here.

In the specification provided here, a large number of specific details are explained. However, it can be understood that embodiments of the present application can be practiced without these specific details. In some examples, well-known methods, structures, and techniques are not shown in detail to avoid blurring the understanding of this specification.

Similarly, it should be understood that in order to streamline this disclosure and aid in understanding one or more aspects of the application, in the above description of exemplary embodiments of the application, the various features of the application are sometimes grouped together into a single embodiment, figure, or description thereof. However, the disclosed method should not be interpreted as reflecting the intention that the claimed application requires more features than those explicitly stated in each claim. More precisely, as reflected in the following claims, the aspect of the application lies in having fewer than all the features of the single embodiment disclosed earlier. Therefore, the claims that follow the specific embodiments are explicitly incorporated into the specific embodiments, where each claim itself serves as a separate embodiment of the present application.

In addition, those skilled in the art can understand that although some embodiments herein include certain features included in other embodiments rather than other features, the combination of features of different embodiments implies that they are within the scope of the present application and form different embodiments. For example, in the following claims, any one of the embodiments claimed for protection can be used in any combination.

It should be noted that the above embodiments illustrate the present application rather than limit it, and those skilled in the art may design alternative embodiments without departing from the scope of the appended claims. In the claims, any reference symbols located between parentheses should not be constructed as limitations on the claims. The word 'comprise' does not exclude the existence of elements or steps that are not listed in the claims. The word 'a' or 'an' before the component does not exclude the existence of multiple such components. The present application can be implemented by means of hardware comprising several different elements and by means of a properly programmed computer. In the unit claims listing several devices, several of these devices may be specifically embodied through the same hardware item. The use of words such as first, second, and third does not indicate any order. These words can be interpreted as names.

The invention claimed is:

1. An LED light source simultaneously compatible with SCR dimming and intelligent dimming, characterized in that the LED light source comprises a power supply unit, an intelligent dimming unit, a constant-current unit, a SCR current output unit, and a central control unit, wherein an output terminal of the power supply unit is connected to an input terminal of the central control unit, an input terminal of the intelligent dimming unit and an input terminal of the constant-current unit, the central control unit is in bidirectional communication with the intelligent dimming unit, and an output terminal of the central control unit is also connected to an input terminal of the SCR current output unit, an output terminal of the intelligent dimming unit is also connected to an input terminal of the constant-current unit, and an output terminal of the SCR current output unit is connected to an input terminal of the power supply unit; and wherein the central control unit is configured to collect a SCR phase-cut angle of the power supply unit, and generate a feedback signal based on the SCR phase-cut angle and send the feedback signal to the intelligent dimming unit; the intelligent dimming unit is configured to receive a control signal from a IOT terminal, and generate a dimming signal based on the control signal and the feedback signal and send the dimming signal to the constant-current unit, and also configured to generate an adjustment signal based on the control signal and send the adjustment signal to the central control unit; the constant-current unit is configured to adjust light emission state according to the dimming signal; the central control unit is also configured to generate a SCR current control signal based on the SCR phase-cut angle or the adjustment signal and send the SCR current control signal to the SCR current output unit; and the SCR current output unit is configured to adjust output current according to the SCR current control signal.

2. The LED light source simultaneously compatible with SCR dimming and intelligent dimming according to claim 1, characterized in that the intelligent dimming unit comprises a power supply selecting module, an AC-DC power supply module, an LDO power supply module and an intelligent control module, wherein an input terminal of the power supply selecting module is connected to the output terminal of the power supply unit, and an output end of the power supply selecting module is connected to an input terminal of the AC-DC power supply module and an input terminal of the LDO power supply module; an output terminal of the AC-DC power supply module and an output terminal of the LDO power supply module are connected to an input terminal of the intelligent control module; and the power supply selecting module selects one of the AC-DC power supply module and the LDO power supply module to supply power to the intelligent control module based on an output voltage of the power supply unit.

3. The LED light source simultaneously compatible with SCR dimming and intelligent dimming according to claim 2, characterized in that the power supply unit comprises a SCR dimmer, a rectification circuit and an isolation diode D1, wherein an input terminal of the SCR dimmer is connected to an AC input signal, and an output terminal of the SCR dimmer is connected to an input terminal of the rectification circuit, a first terminal of the rectification circuit is connected to the input terminal of the central control unit, and a second terminal of the rectification circuit is connected to a positive terminal of the isolation diode D1, a negative terminal of the isolation diode D1 is connected to the input terminal of the intelligent dimming unit and the input terminal of the constant-current unit; and the AC input signal passes through the SCR dimmer and the rectification circuit to output a chopped voltage signal.

4. The LED light source simultaneously compatible with SCR dimming and intelligent dimming according to claim 3, characterized in that the central control unit comprises a SCR phase detecting module and a central core control module, wherein an input terminal of the SCR phase detecting module is connected to the power supply unit, an output terminal of the SCR phase detecting module is connected to the central core control module, the central core control module communicates bi-directionally with the intelligent control module; and wherein the SCR phase detecting module is configured to collect a SCR phase-cut angle of the power supply unit; the central core control module is configured to send the feedback signal to the intelligent control module when the SCR phase-cut angle is less than a first preset threshold, and simultaneously send a SCR current control signal to the SCR current output unit to control the SCR current output unit to increase the output current, and send a SCR current control signal to the SCR current output unit to control the SCR current output unit to decrease the output current when the SCR phase-cut angle is greater than a second preset threshold, wherein the first preset threshold is less than the second preset threshold.

5. The LED light source simultaneously compatible with SCR dimming and intelligent dimming according to claim 4, characterized in that the constant-current unit comprises an LED constant-current module and an LED light group module, wherein an input terminal of the LED constant-current module is connected to the intelligent control module, an output terminal of the LED constant-current module is connected to an input terminal of the LED light group module, and the input terminal of the LED light group module is also connected to the output terminal of the power supply unit; and the intelligent control module sends a standby instruction to the LED constant-current module when receiving the feedback signal, and the LED constant-current module turns off the LED light group module according to the standby instruction.

6. The LED light source simultaneously compatible with SCR dimming and intelligent dimming according to claim 4, characterized in that when the control instruction is standby or low brightness, the intelligent control module generates the adjustment signal to the central core control module according to the control instruction, and the central core control module sends a SCR current control signal to the SCR current output unit to control the SCR current output unit to reduce the output current.

7. The LED light source simultaneously compatible with SCR dimming and intelligent dimming according to claim 4, characterized in that the SCR phase detecting module comprises a resistor R2, a resistor R3 and a clamp tube DZ1, wherein one end of the resistor R2 is connected to the output terminal of the power supply unit, the other end of the resistor R2 is connected to one end of the resistor R3, a negative terminal of the clamp tube DZ1 and the central core control module, and the other end of the resistor R3 and a positive terminal of the clamp tube DZ1 are grounded.

8. An LED lamp comprising an LED light source simultaneously compatible with SCR dimming and intelligent dimming, characterized in that the LED light source comprises a power supply unit, an intelligent dimming unit, a constant-current unit, a SCR current output unit, and a central control unit, wherein an output terminal of the power supply unit is connected to an input terminal of the central control unit, an input terminal of the intelligent dimming unit and an input terminal of the constant-current unit, the central control unit is in bidirectional communication with the intelligent dimming unit, and an output terminal of the central control unit is also connected to an input terminal of the SCR current output unit, an output terminal of the intelligent dimming unit is also connected to an input terminal of the constant-current unit, and an output terminal of the SCR current output unit is connected to an input terminal of the power supply unit; and wherein the central control unit is configured to collect a SCR phase-cut angle of the power supply unit, and generate a feedback signal based on the SCR phase-cut angle and send the feedback signal to the intelligent dimming unit; the intelligent dimming unit is configured to receive a control signal from a IOT terminal, and generate a dimming signal based on the control signal and the feedback signal and send the dimming signal to the constant-current unit, and also configured to generate an adjustment signal based on the control signal and send the adjustment signal to the central control unit; the constant-current unit is configured to adjust light emission state according to the dimming signal; the central control unit is also configured to generate a SCR current control signal based on the SCR phase-cut angle or the adjustment signal and send the SCR current control signal to the SCR current output unit; and the SCR current output unit is configured to adjust output current according to the SCR current control signal.

9. The LED lamp according to claim 8, characterized in that the intelligent dimming unit comprises a power supply selecting module, an AC-DC power supply module, an LDO power supply module and an intelligent control module, wherein an input terminal of the power supply selecting module is connected to the output terminal of the power supply unit, and an output end of the power supply selecting module is connected to an input terminal of the AC-DC power supply module and an input terminal of the LDO power supply module; an output terminal of the AC-DC power supply module and an output terminal of the LDO power supply module are connected to an input terminal of the intelligent control module; and the power supply selecting module selects one of the AC-DC power supply module and the LDO power supply module to supply power to the intelligent control module based on an output voltage of the power supply unit.

10. The LED lamp according to claim 9, characterized in that the power supply unit comprises a SCR dimmer, a rectification circuit and an isolation diode D1, wherein an input terminal of the SCR dimmer is connected to an AC input signal, and an output terminal of the SCR dimmer is connected to an input terminal of the rectification circuit, a first terminal of the rectification circuit is connected to the input terminal of the central control unit, and a second terminal of the rectification circuit is connected to a positive terminal of the isolation diode D1, a negative terminal of the isolation diode D1 is connected to the input terminal of the intelligent dimming unit and the input terminal of the constant-current unit; and the AC input signal passes through the SCR dimmer and the rectification circuit to output a chopped voltage signal.

11. The LED lamp according to claim 10, characterized in that the central control unit comprises a SCR phase detecting module and a central core control module, wherein an input terminal of the SCR phase detecting module is connected to the power supply unit, an output terminal of the SCR phase detecting module is connected to the central core control module, the central core control module communicates bi-directionally with the intelligent control module; and wherein the SCR phase detecting module is configured to collect a SCR phase-cut angle of the power supply unit; the central core control module is configured to send the feedback signal to the intelligent control module when the SCR phase-cut angle is less than a first preset threshold, and simultaneously send a SCR current control signal to the SCR current output unit to control the SCR current output unit to increase the output current, and send a SCR current control signal to the SCR current output unit to control the SCR current output unit to decrease the output current when the SCR phase-cut angle is greater than a second preset threshold, wherein the first preset threshold is less than the second preset threshold.

12. The LED lamp according to claim 11, characterized in that the constant-current unit comprises an LED constant-current module and an LED light group module, wherein an input terminal of the LED constant-current module is connected to the intelligent control module, an output terminal of the LED constant-current module is connected to an input terminal of the LED light group module, and the input terminal of the LED light group module is also connected to the output terminal of the power supply unit; and the intelligent control module sends a standby instruction to the LED constant-current module when receiving the feedback signal, and the LED constant-current module turns off the LED light group module according to the standby instruction.

13. The LED lamp according to claim 11, characterized in that when the control instruction is standby or low brightness, the intelligent control module generates the adjustment signal to the central core control module according to the control instruction, and the central core control module sends a SCR current control signal to the SCR current output unit to control the SCR current output unit to reduce the output current.

14. The LED lamp according to claim 11, characterized in that the SCR phase detecting module comprises a resistor R2, a resistor R3 and a clamp tube DZ1, wherein one end of the resistor R2 is connected to the output terminal of the power supply unit, the other end of the resistor R2 is connected to one end of the resistor R3, a negative terminal of the clamp tube DZ1 and the central core control module, and the other end of the resistor R3 and a positive terminal of the clamp tube DZ1 are grounded.

* * * * *